(12) United States Patent
Doi et al.

(10) Patent No.: US 9,896,038 B2
(45) Date of Patent: Feb. 20, 2018

(54) WORK VEHICLE

(71) Applicant: KOMATSU LTD., Tokyo (JP)

(72) Inventors: Yuichi Doi, Komatsu (JP); Jun Yonehara, Komatsu (JP); Nobuko Yoneda, Nomi (JP); Hidehiko Kobayashi, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/118,228

(22) PCT Filed: Dec. 4, 2015

(86) PCT No.: PCT/JP2015/084150
§ 371 (c)(1),
(2) Date: Aug. 11, 2016

(87) PCT Pub. No.: WO2016/068348
PCT Pub. Date: May 6, 2016

(65) Prior Publication Data
US 2017/0175357 A1  Jun. 22, 2017

(51) Int. Cl.
| | |
|---|---|
| *B60R 11/00* | (2006.01) |
| *B62D 21/03* | (2006.01) |
| *E02F 9/08* | (2006.01) |
| *E02F 9/16* | (2006.01) |
| *E02F 3/32* | (2006.01) |
| *B62D 21/09* | (2006.01) |

(52) U.S. Cl.
CPC .............. *B60R 11/00* (2013.01); *B62D 21/03* (2013.01); *B62D 21/09* (2013.01); *E02F 3/32* (2013.01); *E02F 9/0808* (2013.01); *E02F 9/0833* (2013.01); *E02F 9/0891* (2013.01); *E02F 9/16* (2013.01); *B60R 2011/0029* (2013.01)

(58) Field of Classification Search
CPC ......... B60R 11/00; B62D 21/02; B62D 21/03; B62D 21/186; E02F 3/32; E02F 9/0808; E02F 9/0858; E02F 9/0891; E02F 9/16
USPC ................ 296/24.45, 37.1, 193.07, 204, 205
See application file for complete search history.

(56) References Cited

U.S. PATENT DOCUMENTS

| | | | |
|---|---|---|---|
| 2015/0191895 A1* | 7/2015 | Shimomura | E02F 9/0883 280/830 |
| 2015/0299983 A1 | 10/2015 | Okamoto et al. | |
| 2016/0121947 A1* | 5/2016 | Lyle | E02F 3/325 180/306 |

FOREIGN PATENT DOCUMENTS

| | | | |
|---|---|---|---|
| JP | H08-260514 A | 10/1996 | |
| JP | 2001-064995 A | 3/2001 | |
| JP | 2002-061225 A | 2/2002 | |
| JP | 2003-268802 A | 9/2003 | |
| JP | 2008-189194 A | 8/2008 | |

(Continued)

*Primary Examiner* — Jason S Daniels
(74) *Attorney, Agent, or Firm* — Drinker Biddle & Reath LLP

(57) ABSTRACT

A work vehicle which can provide more accommodation space for articles on a vehicular body frame is provided. A rear cab mount on which a cab of a hydraulic excavator is mounted is mounted on a revolving frame and forms a hollow rear under-mount space. An opening portion is formed at a position corresponding to a side of the rear under-mount space in an exterior cover which laterally covers the revolving frame. A rear door body can open and close the opening portion. The rear door body opens the rear under-mount space to an external space with the opening portion being opened.

7 Claims, 6 Drawing Sheets

(56) References Cited

FOREIGN PATENT DOCUMENTS

| | | |
|---|---|---|
| JP | 2009-012764 A | 1/2009 |
| JP | 2010-168870 A | 8/2010 |
| JP | 2013-238081 A | 11/2013 |
| JP | 2014-198936 A | 10/2014 |
| JP | 2015-206223 A | 11/2015 |

* cited by examiner

WORK VEHICLE

TECHNICAL FIELD

The present invention relates to the work vehicle.

BACKGROUND ART

Conventionally, following vehicular body construction of a work vehicle is proposed. A frame body is formed below an operator's cab mounted on a vehicular body of the work vehicle, and an inner space of the frame body is configured such that apparatus and tools may be disposed therein. An window hole portion which can be opened and closed is provided on the frame body. By rotating a window hole cover, the window hole portion is opened, the apparatus and the tools can be stored in or can be taken out of the inside of the frame body (for example, refer to Japanese Patent Laying-Open No. 8-260514 (PTD 1)).

CITATION LIST

Patent Document

PTD 1: Japanese Patent Laying-Open No. 8-260514

SUMMARY OF INVENTION

Technical Problem

In recent years, it is required to mount more apparatus on the vehicular body frame of the work vehicle. In PTD 1, the structure of making use of the space below the cab to dispose the apparatus and the tools is proposed, however, it is not necessarily enough for responding the request of the increase of apparatus to be loaded in recent years. It is required to make use of more space on the vehicular body frame as a space in which apparatus and the tools can be accommodated.

The object of the present invention is to provide a work vehicle which makes it possible to provide a more accommodation space for an article, such as a tool box, on a vehicular body frame.

Solution to Problem

A work vehicle according to the present invention includes a vehicular body frame, a cab mount, a cab, an exterior cover, and an opening and closing cover. The cab mount is mounted on the vehicular body frame and forms a hollow under-mount space. The cab is mounted on the cab mount. The exterior cover laterally covers the vehicular body frame. An opening portion is formed at a position in the exterior cover, which corresponds to a side of the under-mount space. The opening and closing cover can open and close the opening portion. The opening and closing cover serves as a partition between the under-mount space and an external space with the opening portion being closed. The opening and closing cover opens the under-mount space to the external space with the opening portion being opened.

According to the work vehicle in the present invention, since the under-mount space can be made use of as a space for accommodating an article, a large number of articles can be mounted on the vehicular body frame.

The work vehicle includes a removable article. The removable article can be accommodated in and can be taken out of the under-mount space. By opening and closing the opening and closing cover, the removable article can readily be accommodated in the under-mount space or can be taken out of the under-mount space.

In the work vehicle, the cab mount has a front cab mount and a rear cab mount. The rear cab mount is arranged in the rear of the front cab mount. The rear cab mount is arranged at a distance from the front cab mount. The under-mount space includes a front under-mount space and a rear under-mount space. The front under-mount space is formed to be hollow by the front cab mount. The rear under-mount space is formed to be hollow by the rear cab mount. Any one of the front under-mount space and the rear under-mount space, preferably, the rear under-mount space, is opened to the external space with the opening and closing cover being opened.

By opening any one of the front under-mount space and the rear under-mount space to the external space, any one under-mount space can be made use of as an accommodation space and a large number of articles can be mounted on the vehicular body frame. By forming the opening portion so as to open the rear under-mount space to the external space, lowering in strength of the exterior cover can be suppressed.

In the work vehicle, the cab is arranged above the vehicular body frame at a distance from the vehicular body frame. A hollow inter-mount space is formed between the front cab mount and the rear cab mount. The opening portion is formed across the position corresponding to the side of the under-mount space and a position corresponding to a side of the inter-mount space. By doing so, since an opening area of the opening portion can be large, accommodation and taking out of an article is facilitated.

In the work vehicle, the opening and closing cover has a pair of doors of a double-door type. By doing so, an operation to open and close the opening portion is facilitated and a space necessary for opening the opening and closing cover can be reduced.

In the work vehicle, the cab mount has an inverted U shape and forms the under-mount space together with the vehicular body frame. By doing so, the under-mount space surrounded by the vehicular body frame and the cab mount can be formed.

Advantageous Effects of Invention

According to the present invention, a more accommodation space for such an article as a tool box can be provided on a vehicular body frame of a work vehicle.

DESCRIPTION OF EMBODIMENTS

Hereinafter, an embodiment of the present invention will be described based on the drawings.

First, a configuration of a hydraulic excavator to which the concept of the present invention can be applied will be explained.

Figure 1:
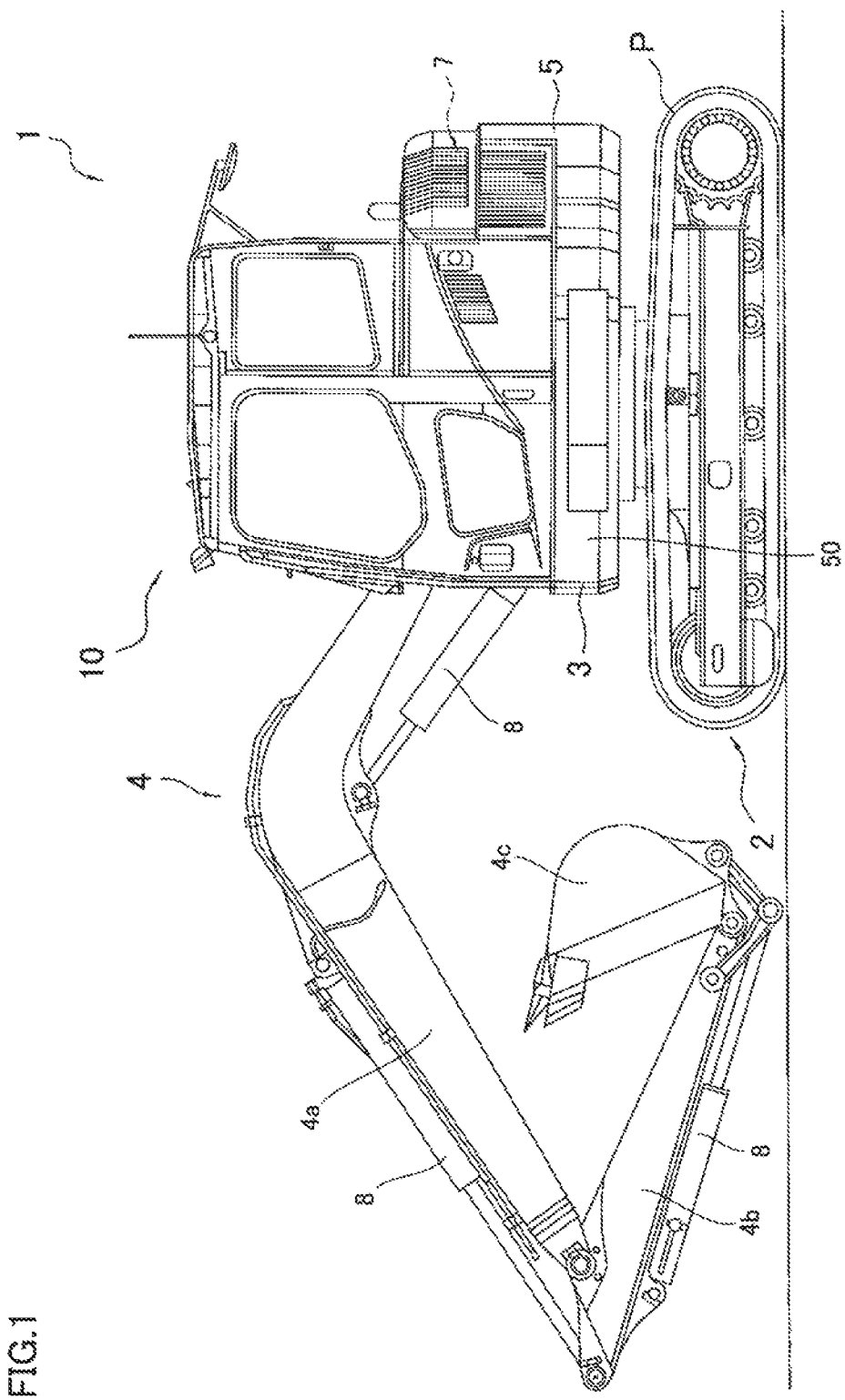
FIG. 1 is a side view showing a configuration of a hydraulic excavator according to one embodiment of the present invention.

FIG. 1 is a side view showing a configuration of a hydraulic excavator 1 according to one embodiment of the present invention. Hydraulic excavator 1 according to the present embodiment mainly includes a traveling unit 2, a revolving unit 3, a work implement 4, a counter weight 5, an engine 7, and a cab 10, as shown in FIG. 1. The main body of the hydraulic excavator is mainly constituted by traveling unit 2 and revolving unit 3.

Traveling unit 2 has a pair of crawler belts P wound around left and right opposing end portions in a direction of travel. Traveling unit 2 is configured to be self-propelled as the pair of crawler belts P rotates.

Revolving unit 3 is set to be revolvable in any direction with respect to traveling unit 2. Revolving unit 3 includes, on a front left side, cab 10 which is an operator's cab that an operator of hydraulic excavator 1 gets on and off. Revolving unit 3 includes, on a rear side, an engine compartment for accommodating engine 7 and counter weight 5.

In the present embodiment, a forward side (a front side) of the operator while the operator is seated in cab 10 is defined as the forward side of revolving unit 3, a rear side of the operator is defined as the rear side of revolving unit 3, a left side of the operator in a seated state is defined as the left side of revolving unit 3, and a right side of the operator in the seated state is defined as the right side of revolving unit 3. In the following description, front and rear, right and left of revolving unit 3 are assumed to be matched with front and rear, right and left of hydraulic excavator 1, respectively. The direction orthogonal to a plane defined by the front/rear direction and the right/left direction is defined as the upward/downward direction. In the upward/downward direction, the ground side is lower side and the sky side is upper side.

Work implement 4 for such work as excavation of soil is pivotally supported by revolving unit 3 so as to be freely operable in the upward/downward direction. Work implement 4 has a boom 4a, an arm 4b, and a bucket 4c. Boom 4a is attached to be operable in the upward/downward direction in a substantially central portion on the forward side of revolving unit 3. Arm 4b is attached to be operable in the front/rear direction at the leading end of boom 4a. Bucket 4c is attached to be operable in the front/rear direction at the leading end of arm 4b. Boom 4a, arm 4b, and bucket 4c are each configured to be driven by a hydraulic cylinder 8.

Work implement 4 is provided on the right side of cab 10, which is one lateral side of cab 10, such that the operator who is aboard cab 10 can view the leading end of work implement 4. Cab 10 is arranged laterally with respect to a portion where work implement 4 is attached.

Counterweight 5 is a weight arranged in the rear portion of revolving unit 3 for keeping balance of the vehicular body during excavation or the like. Hydraulic excavator 1 is formed as a short tail swing hydraulic excavator, which is small in radius of swing of a rear surface of counterweight 5. Therefore, the rear surface of counterweight 5 is formed in an arc shape around a center of swing of revolving unit 3 when viewed from above. Engine 7 is accommodated in the engine compartment in the rear portion of revolving unit 3.

Figure 2:
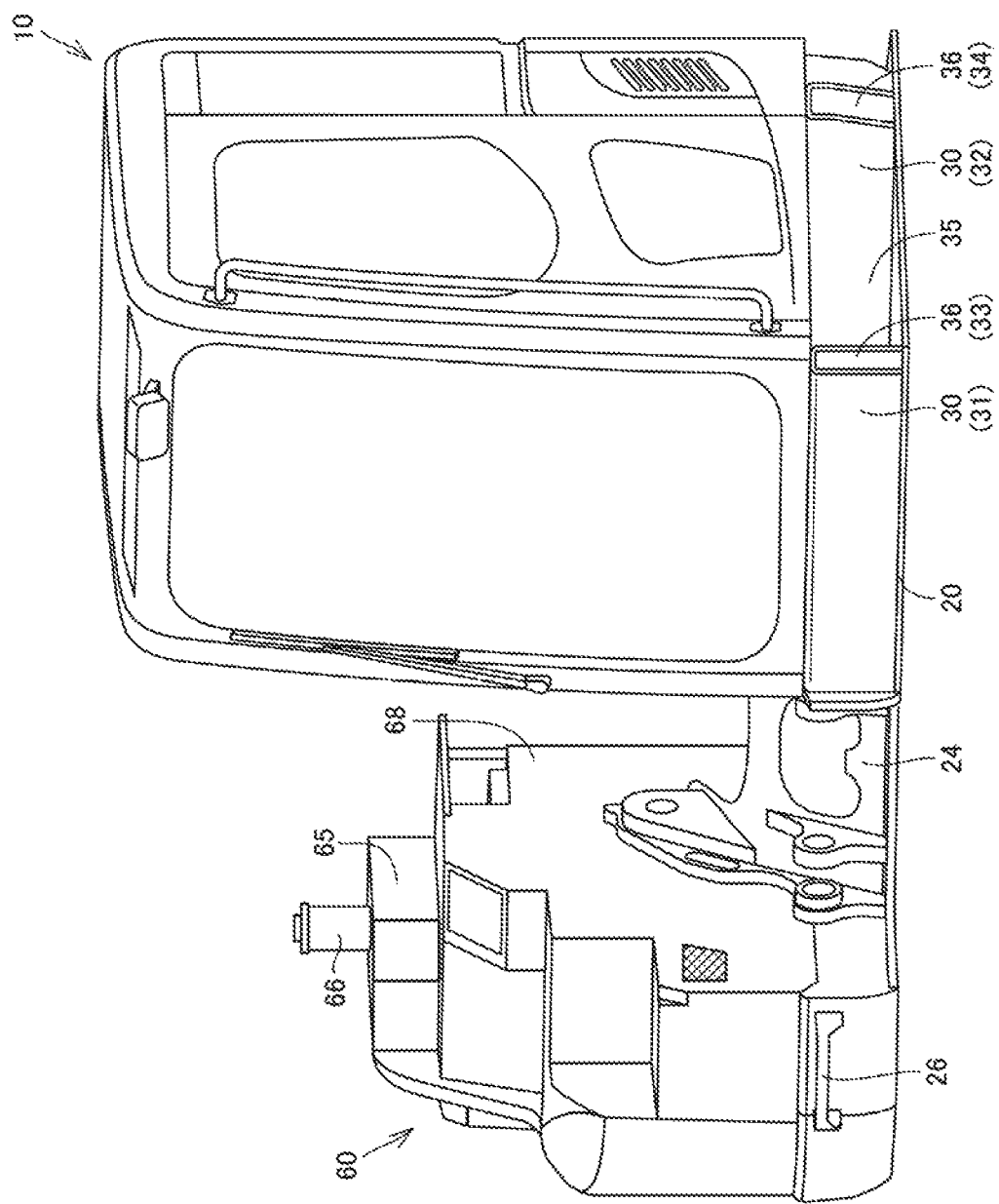
FIG. 2 is a perspective view showing a partial configuration of a revolving unit of the hydraulic excavator of FIG. 1.

FIG. 2 is a perspective view showing a partial configuration of revolving unit 3 of hydraulic excavator 1 of FIG. 1. A part of configuration of revolving unit 3 of hydraulic excavator 1 shown in FIG. 1 seen from the front left side is illustrated in FIG. 2. A state where an exterior cover 50 described later herein is removed from revolving unit 3 is illustrated in FIG. 2.

As shown in FIG. 2, revolving unit 3 has a revolving frame 20. Revolving frame 20 is included in the main body of the hydraulic excavator. Revolving frame 20 is arranged above traveling unit 2 shown in FIG. 1. Revolving frame 20 is provided to freely revolve in any directions with respect to traveling unit 2. Revolving frame 20 configures a vehicular body frame of hydraulic excavator 1.

At the front end of a central portion in the right/left direction of revolving frame 20, a center bracket 24 is provided. The proximal end of work implement 4 shown in FIG. 1 is attached to center bracket 24. Center bracket 24 supports work implement 4 of hydraulic excavator 1, and configures the portion where work implement 4 is attached.

At a front right side of revolving frame 20, a front cover 60 is arranged. Tank covers 65, 68 are arranged rearward with respect to front cover 60. In tank cover 65, a fuel tank 67 not shown in FIG. 2 is housed. Fuel tank 67 stores a fuel to be supplied to engine 7. In the upper surface of tank cover 65, a filler port 66 is provided for replenishing fuel tank 67 with fuel. In tank cover 68, a hydraulic oil tank is housed. The hydraulic oil tank stores a hydraulic oil to be supplied to such a hydraulic actuator as hydraulic cylinder 8 (FIG. 1).

Front cover 60 is provided between tank covers 65, 68 and the front end of revolving unit 3. In front cover 60, a tank room which houses a reducing agent tank, and a valve room which houses a main valve are formed. The reducing agent tank stores a reducing agent used for exhaust gas treatment of an exhaust gas from engine 7. The main valve supplies the hydraulic oil stored in the hydraulic oil tank to the hydraulic actuators, such as hydraulic cylinder 8 shown in FIG. 1, a motor for travel and a motor for swing which are not shown.

A step 26 is provided to protrude forward from front cover 60. Front cover 60 constitutes a shape of stairs. Placement of feet on step 26 and then on front cover in order enables easy access onto an upper surface of front cover 60. Thereby, the operator of hydraulic excavator 1 can easily perform work such as replenishment of fuel tank 67 with the fuel, oil supply to the hydraulic oil tank, and maintenance of engine 7.

On the upper surface of the front left side of revolving frame 20, a cab mount 30 is mounted. Cab 10 is mounted on cab mount 30. Cab 10 is arranged above revolving frame 20 with cab mount 30 interposed therebetween. Cab mount 30 has a saddle shape. Cab mount 30 viewed in the right/left direction of revolving unit 3 has an inverted U shape. Cab mount 30 forms a hollow under-mount space 36 with revolving frame 20. Under-mount space 36 is enclosed by the upper surface of revolving frame 20 and an inner surface of cab mount 30. The inner surface of cab mount 30 defines an upper boundary, a front boundary and a rear boundary of under-mount space 36.

Cab mount 30 has a front cab mount 31 and a rear cab mount 32. Front cab mount 31 and rear cab mount 32 are arranged aligned in the front/rear direction. Rear cab mount 32 is arranged in the rear of front cab mount 31. Rear cab mount 32 is arranged at a distance from front cab mount 31.

Cab 10 is placed on front cab mount 31 and rear cab mount 32. Between cab 10 and revolving frame 20, front cab mount 31 and rear cab mount 32 are interposed. Cab 10 is arranged above revolving frame 20 with front cab mount 31 and rear cab mount 32 interposed therebetween.

Front cab mount 31 and rear cab mount 32 have inverted U shape in the lateral view, respectively. Here, U shape is not limited to a smoothly curved shape. U shape includes an angular shape such as front cab mount 31 and rear cab mount 32 of the embodiment, and widely includes both a shape with chamfered corners and a shape with unchamfered corners. The shape of cab mount 30 (front cab mount 31 and rear cab mount 32) will not be limited, if the shape surrounds the three sides of a hollow space. The inverted U shape is defined such that the two end portions of U shape are arranged downward and U shape is opened downward.

Front cab mount 31 forms a hollow front under-mount space 33 with revolving frame 20. Front under-mount space 33 is enclosed by the upper surface of revolving frame 20 and an inner surface of front cab mount 31. Rear cab mount 32 forms a hollow rear under-mount space 34 with revolving frame 20. Rear under-mount space 34 is enclosed by the upper surface of revolving frame 20 and an inner surface of rear cab mount 32. Under-mount space 36 includes front under-mount space 33 formed by revolving frame 20 and front cab mount 31 and rear under-mount space 34 formed by revolving frame 20 and rear cab mount 32.

Cab 10 is arranged above revolving frame 20 and at a distance from revolving frame 20. Between front cab mount 31 and rear cab mount 32, a hollow inter-mount space 35 is formed. Inter-mount space 35 is enclosed by a lower surface of cab 10, the upper surface of revolving frame 20, an outside surface of front cab mount 31, and an outside surface of rear cab mount 32.

Figure 3:
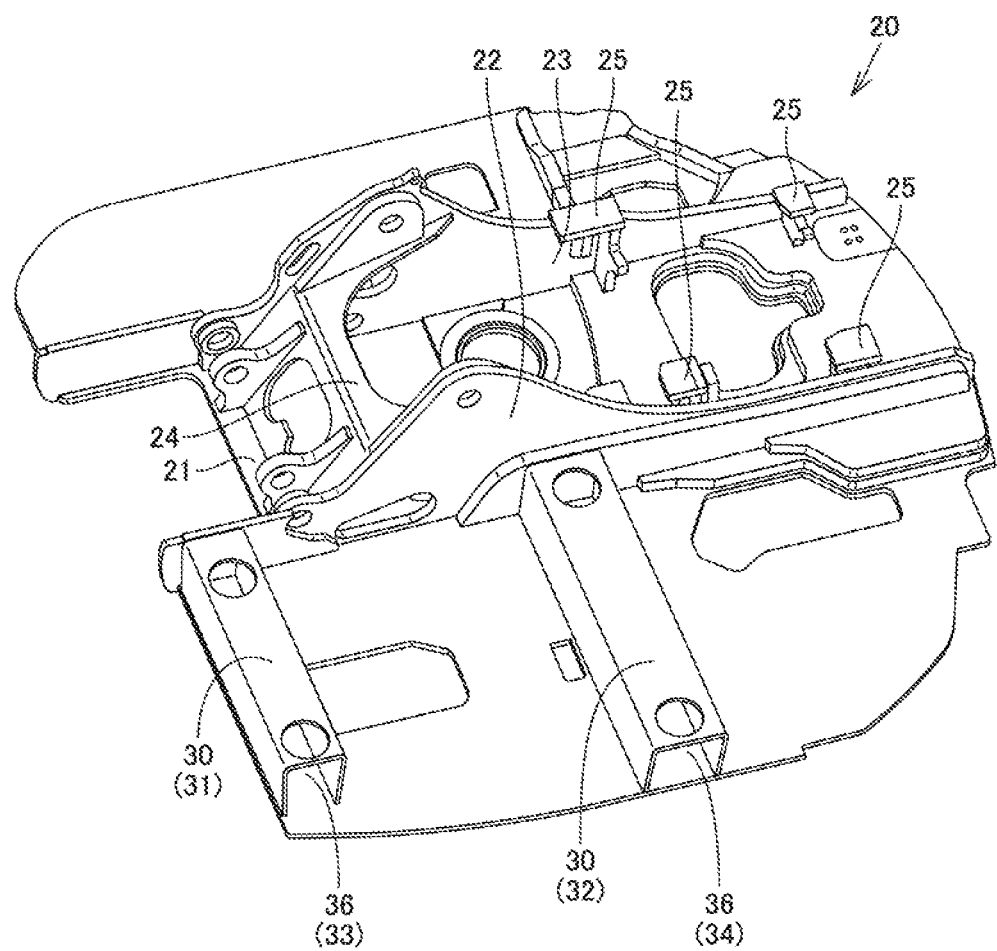
FIG. 3 is a perspective view of a revolving frame.
Figure 4:
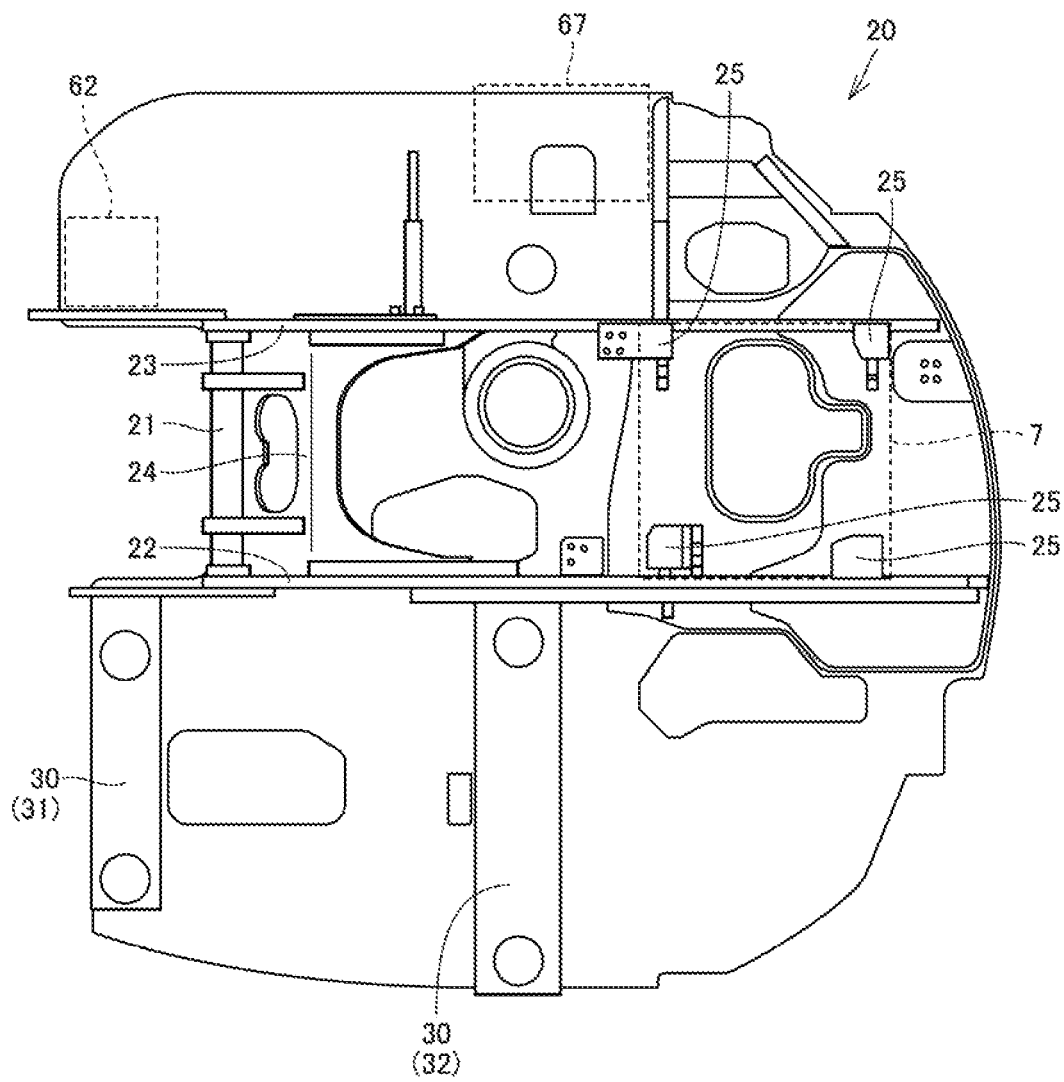
FIG. 4 is a plan view of the revolving frame.
Figure 5:
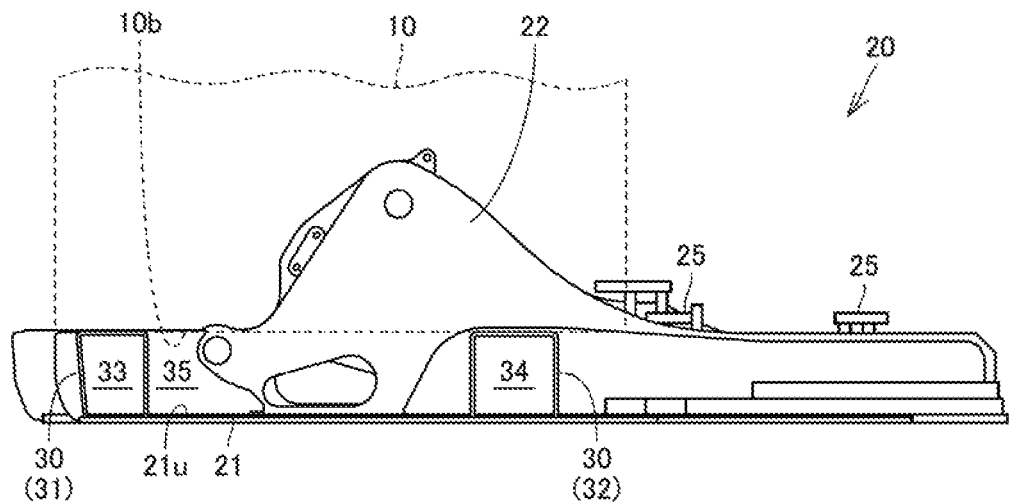
FIG. 5 is a left side view of the revolving frame.

FIG. 3 is a perspective view of revolving frame 20. FIG. 4 is a plan view of revolving frame 20. FIG. 5 is a left side view of revolving frame 20. The left side in FIGS. 4 and 5 shows the front of revolving frame 20, and the right side in FIGS. 4 and 5 shows the rear of revolving frame 20.

As shown in FIGS. 3 and 4, revolving frame 20 has a base plate 21 and a pair of vertical plates 22 and 23. Base plate 21 is a plate-like member extending in the front/rear direction and extending in the right/left direction. Vertical plates 22 and 23 extend along the front/rear direction, and are arranged at a distance in the right/left direction. Each of vertical plates 22 and 23 is configured by a plate that is set up in the upward/downward direction. Vertical plates 22 and 23 are provided to be orthogonal to base plate 21.

Center bracket 24 which supports the proximal end portion of work implement 4 is provided in the front end part of vertical plates 22 and 23. Work implement 4 is equipped between a pair of vertical plates 22 and 23. Work implement 4 is fixed in the state capable of operating in the upward/downward direction. The pair of left and right vertical plates 22 and 23 incline such that the height dimension becomes smaller as they are distant from center bracket 24.

Engine 7 which is the source of power for driving traveling unit 2 and work implement 4 which are shown in FIG. 1 is mounted on revolving frame 20. Engine 7 is mounted in the rear portion of a center frame located in the center of the right/left direction of revolving frame 20. Engine 7 with large weight is arranged, in consideration of weight balance with work implement 4 attached to the front part of the main body of hydraulic excavator, at a rear end of the main body of the hydraulic excavator, which is distant from center bracket 24 which supports work implement 4 and close to counter weight (FIG. 1). Engine compartment accommodating engine 7 is provided in the rear portion of revolving unit 3.

Plurality of engine mount portions 25 are attached to vertical plates 22 and 23. Engine 7 is mounted on engine mount portions 25, and is supported with respect to revolving frame 20. By providing engine mount portions 25 on vertical plates 22 and 23 with large strength, engine 7 with large weight can be supported on revolving frame 20.

A not-shown hydraulic pump which is driven by engine 7 and transfers the hydraulic oil is directly coupled to engine 7. The hydraulic pump is arranged adjacently on the right of engine 7. An exhaust gas treatment unit for treating and purifying the exhaust gas emitted from engine 7 is arranged above the hydraulic pump.

Hydraulic excavator 1 includes a reducing agent supplying unit for supplying the reducing agent to the exhaust gas treatment unit. The reducing agent supplying unit includes reducing agent tank 62. Reducing agent tank 62 stores the reducing agent or a precursor of the reducing agent used for the exhaust gas treatment unit. As the reducing agent, although urea water is used suitably, for example, but the reducing agent is not restricted thereto.

Reducing agent tank 62 is arranged in the right of vertical plate 23 of revolving frame 20. Reducing agent tank 62 is arranged at a distance from engine 7 which is a device at a high temperature, for prevention of deterioration of the reducing agent due to a temperature increase thereof. Reducing agent tank 62 is arranged at the front end of revolving frame 20.

In the right of vertical plate 23 of revolving frame 20, fuel tank 67 is also mounted. Fuel tank 67 stores the fuel to be supplied to engine 7. Since fuel tank 67 is large in weight, it is arranged at a position located forward of the exhaust gas treatment unit in consideration of the weight balance on revolving frame 20. Fuel tank 67 is formed as a pressure-resistant tank in a rectangular parallelepiped shape.

Front cab mount 31 and rear cab mount 32 which configure cab mount 30 are arranged in the left of vertical plate 22 of revolving frame 20. Front cab mount 31 is arranged at the front end of revolving frame 20. Rear cab mount 32 is arranged at a center portion of revolving frame 20 in the front/rear direction. Front cab mount 31 and rear cab mount 32 extend in the right/left direction of revolving unit 3. Front cab mount 31 and rear cab mount 32 extend in a width direction of the vehicular body. In the left side view shown in FIG. 5, front cab mount 31 and rear cab mount 32 have a shape of inverted U shape.

Each of front cab mount 31 and rear cab mount 32 has openings of circular shape in a plan view formed on a upper surface in a vicinity of both a right end and a left end thereof. At each of these openings an vibration control device not shown is arranged. Cab 10 is mounted on front cab mount 31 and rear cab mount 32 with the vibration control device interposed therebetween. The vibration control device is provided in order to reduce a transfer of a vibration to cab 10.

As shown in FIG. 5, base plate 21 has an upper surface 21u. Cab 10 has lower surface 10b. Front under-mount space 33 is surrounded by upper surface 21u of base plate 21 and the inner surface of front cab mount 31. Rear under-mount space 34 is surrounded by upper surface 21u of base plate 21 and the inner surface of rear cab mount 32. Inter-mount space 35 is surrounded by upper surface 21u of base plate 21, a rear surface of front cab mount 31, lower surface 10b of cab 10, and a front surface of rear cab mount 32.

Figure 6:
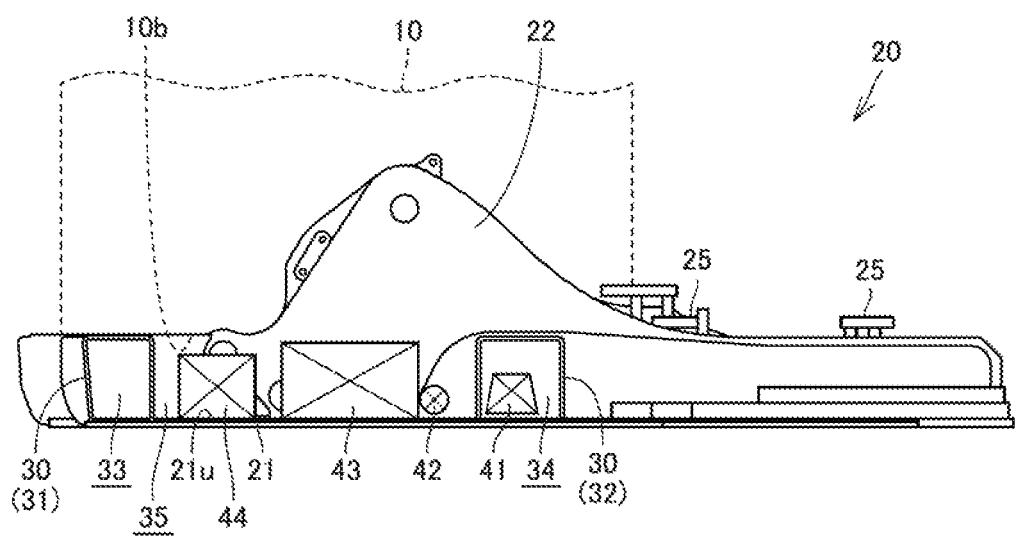
FIG. 6 is a left side view showing a state where articles are mounted on the revolving frame.

FIG. 6 is a left side view showing a state where articles 41-44 are mounted on revolving frame 20. As shown in FIG. 6, plurality of articles 41-44 are mounted on upper surface 21u of base plate 21. Article 41 is accommodated in rear under-mount space 34. Articles 42-44 are accommodated in inter-mount space 35. Article 41 can be taken out of rear under-mount space 34. Articles 42 and 43 can be taken out of inter-mount space 35. Article 44 is fixed to upper surface 21*u* of base plate 21, and cannot be taken out of inter-mount space 35. There is no articles accommodated in front under-mount space 33.

Article 41 is a tool box, for example. Article 42 is a grease gun, for example. Article 43 is a hose for fuel replenishment, for example. Article 44 is a switch valve which can change a correspondence of an operation of a control lever arranged in cab 10 with the operation of work implement 4, for example. Articles 41-44 may not be restricted to these exemplified apparatus and tools, and may be an arbitrary articles.

Figure 7:
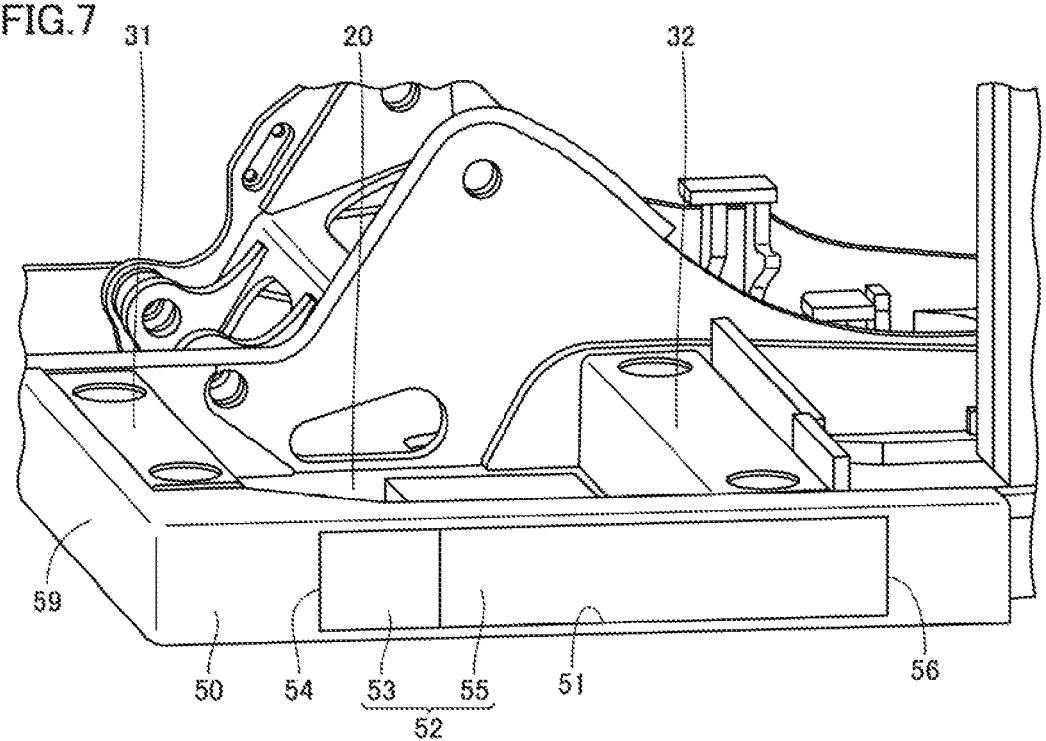
FIG. 7 is a perspective view showing a configuration of an exterior cover.

FIG. 7 is a perspective view showing a configuration of exterior cover 50. As shown in FIG. 7 and FIG. 1, hydraulic excavator 1 includes exterior cover 50. Exterior cover 50 covers revolving frame 20 and cab mount 30 from left. Exterior cover 50 extends in the upward/downward direction from the side of revolving frame 20 to the position where exterior cover 50 reaches lower surface 10*b* (FIG. 6) of cab 10. Front cab mount 31 and rear cab mount 32 are covered with exterior cover 50 from left. Exterior cover 50 covers front under-mount space 33, rear under-mount space 34 and inter-mount space 35 from left.

Hydraulic excavator 1 includes a front exterior cover 59. Front exterior cover 59 covers revolving frame 20 from front. Front exterior cover 59 extends in the upward/downward direction from the side of revolving frame 20 to a position where front exterior cover 59 reaches lower surface 10*b* (FIG. 6) of cab 10. Front cab mount 31 is covered with front exterior cover 59 from front.

An opening portion 51 is formed in exterior cover 50. Opening portion 51 is formed to penetrate exterior cover 50 in the thickness direction. Opening portion 51 is formed at a position corresponding to the side of rear under-mount space 34. Opening portion 51 is formed from a position corresponding to the side of rear under-mount space 34 to a position corresponding to the side of inter-mount space 35. Opening portion 51 is not formed in a position corresponding to the side of front under-mount space 33.

An opening and closing cover 52 is provided in opening portion 51 of exterior cover 50. Opening and closing cover 52 covers opening portion 51 such that opening and closing cover 52 can open and close opening portion 51. Opening and closing cover 52 has a front door body 53 and a rear door body 55. Front door body 53 covers a region including a front edge 54 of opening portion 51. Rear door body 55 covers a region including a rear edge 56 of opening portion 51.

Front door body 53 is joined to front edge 54 of opening portion 51 with a hinge. Front door body 53 is provided such that the front door body can rotate around front edge 54 of opening portion 51. Rear door body 55 is joined to rear edge 56 of opening portion 51 with a hinge. Rear door body 55 is provided such that rear door body can rotate around rear edge 56 of opening portion 51. Front door body 53 and rear door body 55 configure a pair of door bodies of a double-door type. Front door body 53 and rear door body 55 configure a pair of French doors which open and close opening 51.

In FIG. 7, a state where opening portion 51 is closed with opening and closing cover 52 (front door body 53 and rear door body 55) is illustrated. In a state where opening and closing cover 52 closes opening portion 51 and opening portion 51 is covered, a part of inter-mount space 35 is laterally covered with front door body 53, and a part of inter-mount space 35 and rear under-mount space 34 are laterally covered with rear door body 55. Thereby, inter-mount space 35 and rear under-mount space 34 are partitioned from an external space and are separated from the external space by opening and closing cover 52. In the state where opening and closing cover 52 closes opening portion 51, rear under-mount space 34 and inter-mount space 35 cannot be visible from outside, and access from the outside to rear under-mount space 34 and inter-mount space 35 is impossible.

Figure 8:
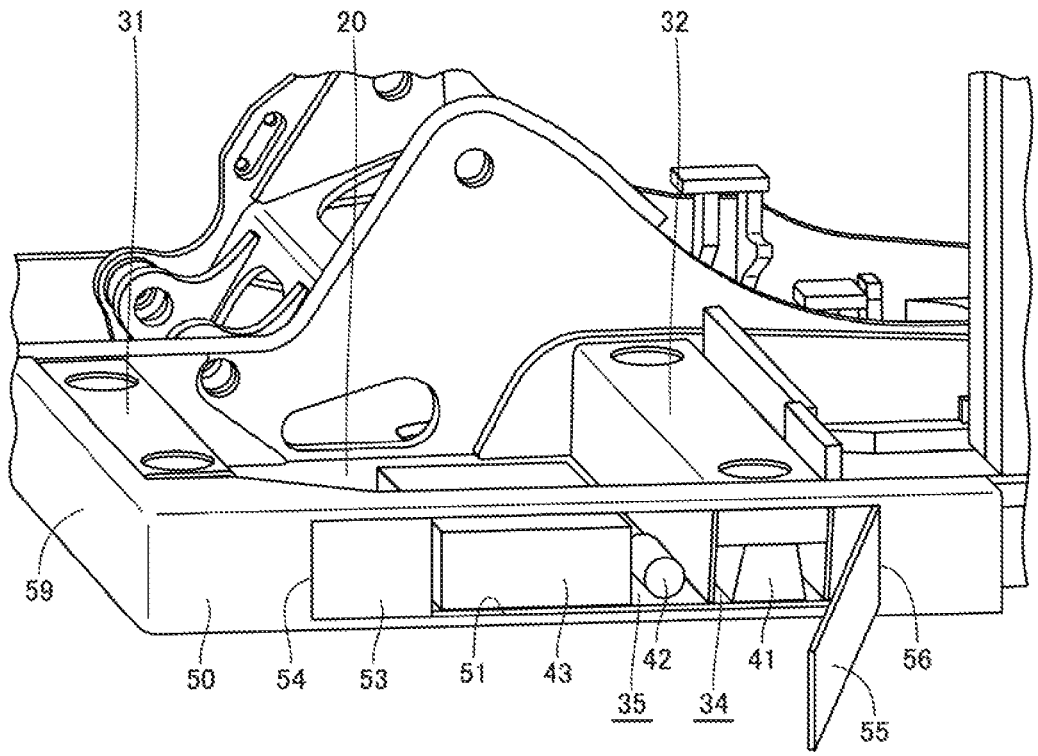
FIG. 8 is a perspective view showing a state where a part of the exterior cover is opened.

FIG. 8 is a perspective view showing a state where a part of exterior cover 50 is opened. In FIG. 8, a state where front door body 53 of opening and closing cover 52 is closed similar to FIG. 7 and rear door body 55 of opening and closing cover 52 is opened is illustrated. As shown in FIG. 8, by opening rear door body 55, rear under-mount space 34 and a part of inter-mount space 35 are exposed to outside. In a state where opening portion 51 is opened, rear under-mount space 34 and a part of inter-mount space 35 are opened to the external space. In a state where rear door body 55 is opened, rear under-mount space 34 inter-mount space 35 can be visible from the side of hydraulic excavator 1, and access from the outside to rear under-mount space 34 and inter-mount space 35 is possible.

The operator of hydraulic excavator 1 can take out article 41 from exposed rear under-mount space 34 and can take out articles 42 and 43 from exposed inter-mount space 35 by opening opening and closing cover 52. Articles 41-43 are provided as removable articles which can be accommodated in and taken out from rear under-mount space 34 or inter-mount space 35.

Next, the function and effect of the present embodiment is explained.

Hydraulic excavator 1 of the embodiment includes cab mount 30, as shown in FIGS. 3 and 4. Cab mount 30 is mounted on revolving frame 20 and forms hollow under-mount space 36.

Hydraulic excavator 1 includes exterior cover 50 which laterally covers revolving frame 20, as shown in FIGS. 7 and 8. Opening portion 51 is formed in exterior cover 50. Opening 51 is formed at the position corresponding to the side of under-mount space 36. Hydraulic excavator 1 includes opening and closing cover 52, as shown in FIGS. 7 and 8. Opening and closing cover 52 can open and close opening portion 51. As shown in FIG. 7, in the state where opening and closing cover 52 closes opening portion 51, under-mount space 36 and the external space are partitioned. As shown in FIG. 8, in the state opening and closing cover 52 opens opening portion 51, under-mount space 36 is opened to the external space.

Opening portion 51 is formed at the position in exterior cover 50 which corresponds to the side of under-mount space 36 and opening and closing cover 52 which can open and close opening portion 51 is provided, thereby under-mount space 36 can be made use of as a space for accommodation articles 41, such as the tool box. Articles 41 can be accommodated in under-mount space 36 which is a dead space in a conventional hydraulic excavator. Therefore, it becomes possible to mount a large number of apparatus and tools, such as reducing agent tank 62, articles 41 such as the tool box, articles 42 such as the grease gun, articles 43 such as the hose, and articles 44 such as the switch valve, and the like on revolving frame 20.

As shown in FIGS. 6 and 8, hydraulic excavator 1 includes article 41. Article 41 is the removable article, which can be accommodated in and taken out from rear under-mount space 36. Article 41 is the tool box, for example. By opening opening and closing cover 52, under-mount space 36 is opened to the external space, and rear under-mount space 36 can be readily accessed to. The operator can take out article 41 from under-mount space 36 in the state where opening and closing cover 52 is opened. When the use of article 41 is ended, the operator can accommodate article 41 in under-mount space 36 and close opening and closing cover 52. Accordingly, article 41 can be accommodated in under-mount space 36.

As shown in FIGS. 3 and 4, cab mount 30 has front cab mount 31 and rear cab mount 32. Rear cab mount 32 is arranged in the rear of front cab mount 31 at a distance from front cab mount 31. Under-mount space 36 includes front under-mount space 33 and rear under-mount space 34. Front under-mount space 33 is formed to be hollow by revolving frame 20 and front cab mount 31. Rear under-mount space 34 is formed to be hollow by revolving frame 20 and rear cab mount 32. As shown in FIG. 8, rear under-mount space 34 is opened to the external space with opening and closing cover 52 opened.

By opening any one of front under-mount space 33 and rear under-mount space 34 to the external space with opening and closing cover 52 opened, any one under-mount space can be made use of as an accommodation space and a large number of apparatus and tools can be mounted on revolving frame 20.

Since front cab mount 31 is arranged at the front end of revolving frame 20 as shown in FIG. 4, the width of the residual cover portion of exterior cover 50 after forming opening portion may become small and the strength of exterior cover 50 may deteriorate, if opening portion is formed in the position corresponding to the side of front under-mount space 33. Therefore, it is more desirable to open rear under-mount space 34 to the external space of front under-mount space 33 and rear under-mount space 34 with opening and closing cover 52 opened and to make use of rear under-mount space 34 as an accommodation space from the viewpoint of restraining the strength deterioration of exterior cover 50.

As shown in FIG. 5, cab 10 is arranged above revolving frame 20 at a distance from revolving frame 20. Between front cab mount 31 and rear cab mount 32, hollow inter-mount space 35 is formed. Opening portion 51 is formed across the position corresponding to the side of rear under-mount space 34 and the position corresponding to the side of inter-mount space 35 as shown in FIG. 8. By doing so, since an opening area of opening portion 51 can be large, accommodation of article 41 into rear under-mount space 34 and taking out of article 41 from rear under-mount space 34 is facilitated.

By opening rear door body 55 of opening and closing cover 52, rear under-mount space 34 and a part of inter-mount space 35 are opened to the external space. When articles 42 and 43 accommodated in inter-mount space 35 are removable articles which can be taken out of inter-mount space 35, one operation opening rear door body 55 makes it possible to accommodate and take out article 41 and articles 42 and 43.

As shown in FIGS. 7 and 8, opening and closing cover 52 has front door body 53 and rear door body 55. Front door body 53 and rear door body 55 configure a pair of doors of double-door type. By doing so, an operation to open and close opening portion 51 is facilitated, and rear under-mount space 45 and inter-mount space 35 can be widely opened by opening both front door body 53 and rear door body 55. In addition, a space necessary for opening opening and closing cover 52 can be reduced.

As shown in FIGS. 3 and 4, cab mount 30 has an inverted U shape. Cab mount 30 is mounted on revolving frame 20, and forms hollow under-mount space 36 with revolving frame 20. By forming cab mount 30 in the inverted U shape, cab mount 30 has high strength. Therefore, cab 10 can be stably mounted on cab mount 30. Under-mount space 36 enclosed by the upper surface of revolving frame 20 and the inner surface of cab mount 30 can be formed by mounting cab mount 30 on revolving frame 20 such that the two end portions of U shape may abut on revolving frame 20.

As shown in FIG. 7, the size of rear door body 55 in the front/rear direction of revolving unit 3 is larger than the size of front door body 53. Since rear door body 55 covering rear under-mount space 34 in which a removable article can be accommodated is formed larger than front door body 53, rear under-mount space 34 can be widely opened by opening rear door body 55.

Front door body 53 is formed in the position corresponding to a front part of the side of inter-mount space 35. In inter-mount space 35 whose side is covered with front door body 53, article 44 (refer to FIG. 6) which is not taken out from inter-mount space 35 and is fixed to revolving frame 20 is accommodated. Article 44 can be accessed from the outside with front door body 53 opened. When article 44 is the switch valve, for example, the frequency of the maintenance of the switch is small and the switch valve is maintainable by putting a hand in inter-mount space 35 from opening portion 51. Therefore, even if a space opened when front door body 53 is opened is small, there is no inconvenience.

Opening portion 51 can be easily formed by laser beam machining of exterior cover 50. Opening and closing cover 52 can be produced using the material cut by laser beam machining, and by doing so, the productivity of hydraulic excavator 1 can be improved.

In the above-mentioned embodiment, an example where cab mount 30 has an inverted U shape is explained. The shape of cab mount 30 is not limited to this example. For example, cab mount 30 can be formed in a hollow substantially rectangular tube shape. In this case, under-mount space 36 the whole periphery of which is enclosed by the inner surface of cab mount 30 can be formed by mounting cab mount 30 on revolving frame 20.

In the above-mentioned embodiment, an example where work implement 4 is arranged on the right side of cab 10 which is arranged on the front left side of revolving unit 3 is explained. The arrangement of cab 10 and work implement 4 is not limited to this example. Work implement 4 may be provided on the left side of cab 10 arranged on the front right side of revolving unit 3. In this case, opening portion is formed in the exterior cover which covers the right side of revolving frame 20, and the under-mount space is formed such that the under-mount space is opened to the external space with the opening portion opened. Accordingly, the effect to increase the accommodation space for apparatus and tools can be achieved similar to the above-mentioned embodiment.

In the above-mentioned embodiment, though a short tail swing radius hydraulic excavator is explained, the present embodiment is applicable to the hydraulic excavator in general. In addition, the present embodiment is applicable also to any work vehicles other than the hydraulic excavator.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 hydraulic excavator; 2 traveling unit; 3 revolving unit; 4 work implement; 7 engine; 10 cab; 10b lower surface; 20 revolving frame; 21 base plate; 21*u* upper surface; 22, 23 vertical plates; 24 center bracket; 25 engine mount portion; 30 cab mount; 31 front cab mount; 32 rear cab mount; 33 front under-mount space; 34 rear under-mount space; 35 inter-mount space; 36 under-mount space; 41, 42, 43 and 44 article; 50 exterior cover; 51 opening portion; 52 opening and closing cover; 53 front door body; 54 front edges; 55 rear door body; 56 rear edge; and 62 reducing agent tank.

The invention claimed is:

1. A work vehicle, comprising:
a vehicular body frame;
a cab mount mounted on the vehicular body frame and forming a hollow under-mount space;
cab mounted on the cab mount;
an exterior cover laterally covering the vehicular body frame and having an opening portion formed at a position corresponding to a side of the under-mount space; and
an opening and closing cover which can open and close the opening portion, serves as a partition between the under-mount space and an external space with the opening portion being closed, and opens the under-mount space to the external space with the opening portion being opened, wherein
the cab mount has a front cab mount and a rear cab mount arranged in rear of the front cab mount at a distance from the front cab mount,
the under-mount space includes a hollow front under-mount space formed by the front cab mount and a hollow rear under-mount space formed by the rear cab mount, and
a removable article which can be accommodated in and can be taken out of the hollow front or rear under-mount space.

2. The work vehicle according to claim 1, wherein
the rear under-mount space is opened to the external space with the opening and closing cover being opened.

3. The work vehicle according to claim 1, wherein
the cab is arranged above the vehicular body frame at a distance from the vehicular body frame,
a hollow inter-mount space is formed between the front cab mount and the rear cab mount, and
the opening portion is formed across the position corresponding to the side of the under-mount space and a position corresponding to a side of the inter-mount space.

4. The work vehicle according to claim 1, wherein
the opening and closing cover has a pair of doors of a double-door type.

5. The work vehicle according to claim 1, wherein
the cab mount has an inverted U shape and forms the tinder-mount space together with the vehicular body frame.

6. The work vehicle according to claim 1, wherein
the under-mount space is enclosed by an upper surface of the vehicle body frame and an inner surface of the cab mount.

7. The work vehicle according to claim 1, wherein
the cab mount extends in a width direction of a vehicular body, and
the cab mount has openings formed on an upper surface in a vicinity of both a right end and a left end thereof.

* * * * *